United States Patent
Matsuda

(10) Patent No.: US 10,547,055 B2
(45) Date of Patent: Jan. 28, 2020

(54) POSITIVE-ELECTRODE ACTIVE MATERIAL FOR NONAQUEOUS-ELECTROLYTE SECONDARY BATTERY, AND POSITIVE ELECTRODE AND SECONDARY BATTERY USING SAID POSITIVE-ELECTRODE ACTIVE MATERIAL

(71) Applicant: SANTOKU CORPORATION, Kobe-shi, Hyogo (JP)

(72) Inventor: Motofumi Matsuda, Kobe (JP)

(73) Assignee: SANTOKU CORPORATION, Kobe-shi (JP)

( * ) Notice: Subject to any disclaimer, the term of this patent is extended or adjusted under 35 U.S.C. 154(b) by 279 days.

(21) Appl. No.: 14/903,516

(22) PCT Filed: Jul. 10, 2014

(86) PCT No.: PCT/JP2014/068461
§ 371 (c)(1),
(2) Date: Jan. 7, 2016

(87) PCT Pub. No.: WO2015/005439
PCT Pub. Date: Jan. 15, 2015

(65) Prior Publication Data
US 2016/0164091 A1 Jun. 9, 2016

(30) Foreign Application Priority Data
Jul. 11, 2013 (JP) .................................. 2013-145489

(51) Int. Cl.
*H01M 4/525* (2010.01)
*H01M 10/052* (2010.01)
(Continued)

(52) U.S. Cl.
CPC ......... *H01M 4/525* (2013.01); *H01M 10/052* (2013.01); *H01M 2004/028* (2013.01)

(58) Field of Classification Search
CPC .... H01M 4/525; H01M 4/366; H01M 10/052; H01M 2004/028; C01G 51/42; C01P 2002/72; C01P 2006/40; C01P 2002/52
See application file for complete search history.

(56) References Cited

U.S. PATENT DOCUMENTS

| 2004/0157125 A1* | 8/2004 | Takatsuji | H01M 4/525 |
|---|---|---|---|
| | | | 429/231.1 |
| 2007/0117014 A1* | 5/2007 | Saito | H01M 4/131 |
| | | | 429/231.3 |

(Continued)

FOREIGN PATENT DOCUMENTS

| CN | 1521875 A | 8/2004 |
|---|---|---|
| CN | 1981396 A | 6/2007 |

(Continued)

OTHER PUBLICATIONS

State Intellectual Property Office of the P.R.C.; communication dated May 27, 2017 in counterpart Application No. 201480049241.3.

(Continued)

*Primary Examiner* — Andrew J. Oyer
(74) *Attorney, Agent, or Firm* — Sughrue Mion, PLLC

(57) ABSTRACT

Provided are a cathode active material that has improved crystal-structure stability during continuous or high-voltage charging of a nonaqueous electrolyte rechargeable material, excellent cycle characteristics (capacity retention), and high capacity, as well as a cathode and a nonaqueous electrolyte rechargeable battery containing the cathode active material. The cathode active material has a composition represented by formula (1):

$$Li_{x-y}Na_yCo_wAl_aMg_bM_cO_{2+\alpha}$$

wherein x, y, w, a, b, c, and α each denotes particular values; and M stands for at least one element selected from Ca, Y, rare earth elements, Ti, Zr, Hf, V, Nb, Ta, Cr, Mo, W, Mn, Fe, Ni, Cu, Ag, Zn, B, Ga, C, Si, Sn, N, P, S, F, and Cl; wherein the cathode active material is in the form of lithium-containing composite oxide particles having a compound adhered on a surface thereof, the compound containing at least one element selected from Al, Mg, and M.

5 Claims, 1 Drawing Sheet

(51) Int. Cl.
*H01M 4/02* (2006.01)
*C01G 51/00* (2006.01)
*H01M 4/36* (2006.01)

(56) References Cited

U.S. PATENT DOCUMENTS

| | | | |
|---|---|---|---|
| 2008/0118829 A1 | 5/2008 | Nanno | |
| 2009/0087731 A1* | 4/2009 | Fukui | H01M 4/131 |
| | | | 429/164 |
| 2009/0148772 A1 | 6/2009 | Kawasato et al. | |
| 2010/0173202 A1 | 7/2010 | Saito et al. | |
| 2011/0059356 A1* | 3/2011 | Ogasawara | H01M 4/366 |
| | | | 429/188 |
| 2011/0244332 A1* | 10/2011 | Saito | H01M 4/505 |
| | | | 429/224 |
| 2011/0287321 A1 | 11/2011 | Hiraki et al. | |
| 2012/0074351 A1 | 3/2012 | Levasseur et al. | |

FOREIGN PATENT DOCUMENTS

| | | |
|---|---|---|
| CN | 101689631 A | 3/2010 |
| CN | 102447102 A | 5/2012 |
| CN | 102891301 A | 1/2013 |
| CN | 102903890 A | 1/2013 |
| CN | 102916193 A | 2/2013 |
| CN | 103050675 A | 4/2013 |
| CN | 103165879 A | 6/2013 |
| EP | 2 395 581 A1 | 12/2011 |
| JP | 2008-152923 A | 7/2008 |
| JP | 2012-043794 A | 3/2012 |
| JP | 2012-252964 A | 12/2012 |

OTHER PUBLICATIONS

International Searching Authority, International Search Report for PCT/JP2014/068461 dated Aug. 12, 2014.
International Searching Authority, Written Opinion for PCT/JP2014/068461 dated Aug. 12, 2014.
European Patent Office, Communication dated Nov. 14, 2016, issued in counterpart European Application No. 14823513.8.
International Searching Authority, International Preliminary Report on Patentability with translation of Written Opinion dated Jan. 21, 2016, issued in application No. PCT/JP2014/068461.
State Intellectual Property Office of the P.R.C.: Communication dated Apr. 16, 2018 in counterpart application No. 201480049241.3.

* cited by examiner

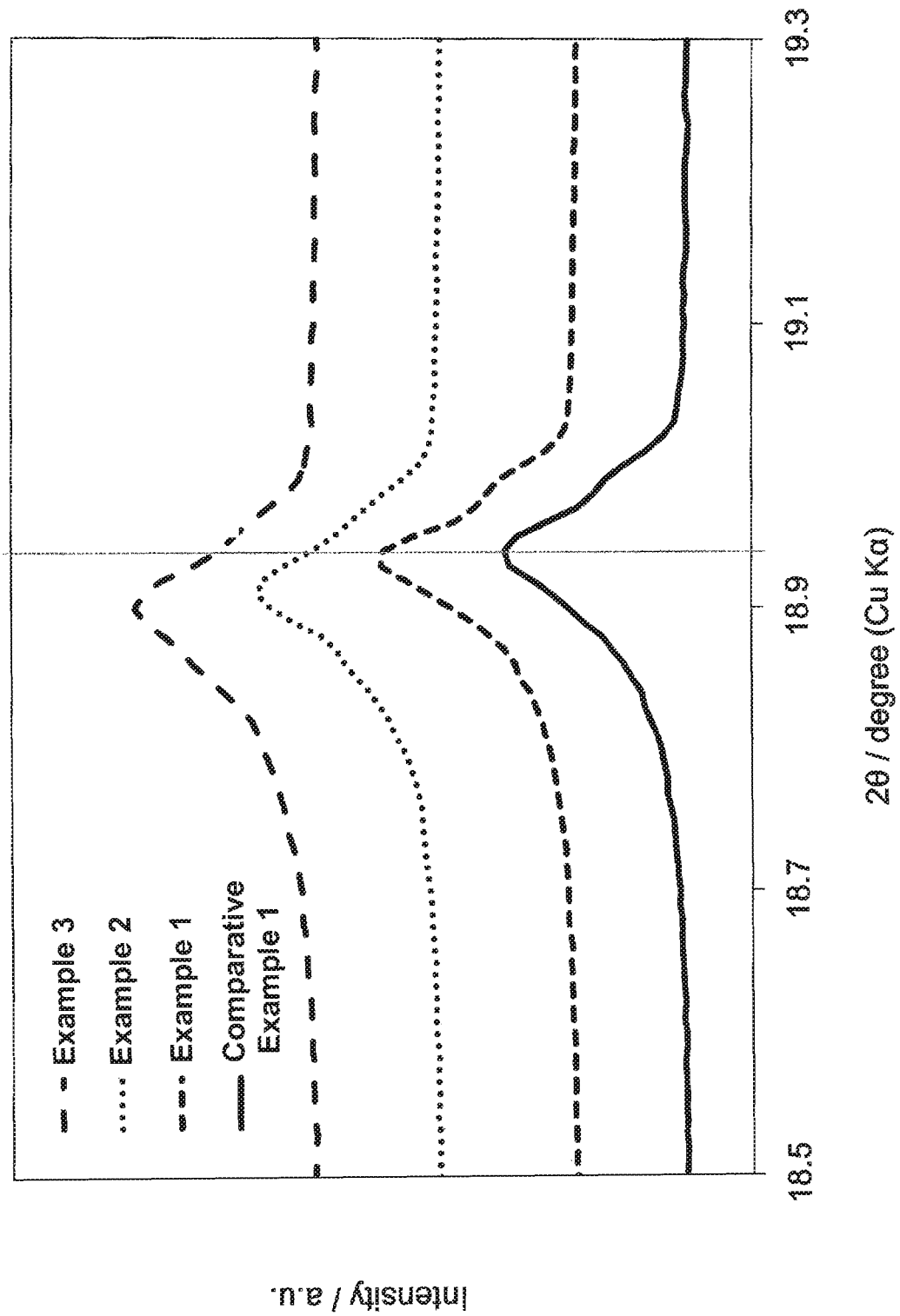

POSITIVE-ELECTRODE ACTIVE MATERIAL FOR NONAQUEOUS-ELECTROLYTE SECONDARY BATTERY, AND POSITIVE ELECTRODE AND SECONDARY BATTERY USING SAID POSITIVE-ELECTRODE ACTIVE MATERIAL

CROSS REFERENCE TO RELATED APPLICATIONS

This application is a National Stage of International Application No. PCT/JP2014/068461 filed Jul. 10, 2014, claiming priority based on Japanese Patent Application No. 2013-145489 filed Jul. 11, 2013, the contents of all of which are incorporated herein by reference in their entirety.

FIELD OF ART

The present invention relates to a cathode active material for nonaqueous electrolyte rechargeable batteries, and a cathode for nonaqueous electrolyte rechargeable batteries and a nonaqueous electrolyte rechargeable battery, both using the cathode active material.

BACKGROUND ART

A lithium ion rechargeable battery, which is a nonaqueous electrolyte rechargeable battery, is widely used in portable electronic devices, such as video cameras, portable audio players, mobile phones, and notebook computers, which have been becoming smaller, lighter, and more powerful. Such electronic devices, on one hand, have been requiring lithium ion rechargeable batteries of still higher capacity and longer life. On the other hand, the circumstances of use of these portable devices have recently been changing, which in turn changes the characteristics required of the battery. It is often observed recently that a battery is charged continuously to keep it fully charged (sometimes referred to as continuous charging hereinbelow). A battery in a notebook computer is often used while it is connected to an external power supply, which places the battery in continuous charging. The same is applied to mobile phones, which is often charged continuously.

Under such circumstances, the cathode material of a lithium ion rechargeable battery deteriorates faster than in normal use. Such deterioration is assumed to occur by a mechanism wherein the electrical current or voltage acts on a cathode material from which Li has been eliminated by charging, to cause further elimination of Li therefrom, resulting in decomposition of the cathode material. When the deterioration proceeds, metal ions generated by decomposition of the cathode material precipitate in the battery system to cause micro-short circuit, which may lead to heat generation and ignition. An external circuit may be provided to minimize the electric current and voltage acting on the cathode for inhibiting the deterioration. Yet, improvement of stability during continuous charging is an essential problem lying in a cathode material of a lithium ion rechargeable battery. Further, it is a recent trend to use a lithium ion rechargeable battery at a high voltage of 4.3 V or higher. Charging at a higher voltage makes available a larger capacity, while the amount of Li leaving the cathode active material increases. It is assumed that the phenomenon similar to the deterioration by continuous charging discussed above is taking place.

For solving the above problems, it has been contemplated to stabilize the structure of the cathode active material. As means for stabilizing the structure, it is known to mix or substitute a cathode active material lithium cobalt oxide with elements other than cobalt (Co).

For example, Patent Publication 1 proposes to substitute part of Co, which constitutes the crystal structure of a lithium-containing composite oxide, which is a cathode active material, with Na or K for stabilizing the crystal structure.

Patent Publication 2 proposes a cathode active material $LiNiO_2$ containing Co, Al, Mg, and at least one element selected from K, Na, Rb, and Cs, so that these elements are present in the Li layer and exhibit so-called the pillar effect during charging wherein Li is eliminated, to effectively inhibit disintegration of the Li layer.

Patent Publication 1: JP 2004-265863 A
Patent Publication 2: JP 2005-116470 A

SUMMARY OF THE INVENTION

Problems to be Solved by the Invention

In neither of the above-mentioned Patent Publications is clarified the behavior during the continuous or high-voltage charging. Patent Publication 1 generally teaches a wide Li content range of $0 \leq a \leq 1.05$, but no actual results other than a=1.0 are disclosed, whereas Patent Publication 2 merely discloses compositions wherein Li=1, so that neither of the publications disclose effects of excess amount of Li. Further, the disintegration of the crystal structure due to Li elimination during continuous or high-voltage charging is hard to be inhibited merely by the addition of and/or substitution with other elements, such as Na, which results in problems of poor structural stability and low capacities.

It is therefore an object of the present invention, in view of the above problems, to provide a cathode active material that exhibits excellent characteristics under the recent circumstances of use, such as continuous or high-voltage charging. In particular, it is an object of the present invention to provide a cathode active material having improved stability of its crystal structure, excellent cycle characteristics (capacity retention), and higher capacity, compared to conventional materials, during continuous or high-voltage charging.

It is another object of the present invention to provide a cathode produced using the above-mentioned cathode active material, and a nonaqueous electrolyte rechargeable battery produced using this cathode.

Means for Solving the Problems

For the purpose of solving the above-mentioned problems, the present inventor has made intensive researches for further improvement of structural stability of a cathode active material, to find out that the problems are solved by partial substitution of Li with Na, an excess Li content, i.e., a Li content in excess of the stoichiometric $LiCoO_2$ ratio, a prescribed range of the ratio of the total content of Li and Na to the total content of the other elements, and adhesion of a compound containing at least one element selected from Al, Mg, and M on the particle surface of a lithium-containing composite oxide, to thereby complete the present invention. Incidentally, the adhesion referred to above is preferably uniform dispersion and adhesion over the particle surface.

According to the present invention, there is provided a cathode active material for a nonaqueous electrolyte rechargeable battery, said cathode active material having a composition represented by formula (1):

$$Li_{x-y}Na_yCo_wAl_aMg_bM_cO_{2+\alpha} \qquad (1)$$

wherein x, y, w, a, b, c, and α fulfill 1.005<(x−y)<1.050, 0<y≤0.020, 1.010<x≤1.050, 0.990≤w≤1.015, 0.005≤a≤0.020, 0.001≤b≤0.020, 0.0005≤c≤0.005, −0.1≤α≤0.1; and M stands for at least one element selected from Ca, Y, rare earth elements, Ti, Zr, Hf, V, Nb, Ta, Cr, Mo, W, Mn, Fe, Ni, Cu, Ag, Zn, B, Ga, C, Si, Sn, N, P, S, F, or Cl;

wherein said cathode active material is in a form of lithium-containing composite oxide particles having a compound adhered on a surface thereof, said compound comprising at least one element selected from Al, Mg, and said M.

According to the present invention, there is also provided a cathode for a nonaqueous electrolyte rechargeable battery comprising the above-mentioned cathode active material.

According to the present invention, there is further provided a nonaqueous electrolyte rechargeable battery having the above-mentioned cathode.

Effect of the Invention

The cathode active material according to the present invention, having the particular composition, provides improved stability of the crystal structure during continuous charging and also during high-voltage charging, and has high capacity and excellent cycle characteristics. Further, by using a cathode containing the cathode active material in a nonaqueous electrolyte rechargeable battery, the rechargeable battery provides improved stability of the crystal structure during continuous charging and also during high-voltage charging, and has high capacity and excellent cycle characteristics.

BRIEF DESCRIPTION OF THE DRAWINGS

FIG. 1 shows X-ray diffraction patterns of cathode active material particles prepared in Examples 1 to 3 and Comparative Example 1.

PREFERRED EMBODIMENTS OF THE INVENTION

The present invention will now be explained in more detail.

The cathode active material according to the present invention is for a nonaqueous electrolyte rechargeable battery, and of a composition represented by formula (1):

$$Li_{x-y}Na_yCo_wAl_aMg_bM_cO_{2+\alpha} \qquad (1)$$

wherein x, y, w, a, b, c, and α fulfill 1.005<(x−y)<1.050, 0<y≤0.020, 1.010<x≤1.050, 0.990≤w≤1.015, 0.005≤a≤0.020, 0.001≤b≤0.020, 0.0005≤c≤0.005, and −0.1≤α≤0.1; and M stands for at least one element selected from Ca, Y, rare earth elements, Ti, Zr, Hf, V, Nb, Ta, Cr, Mo, W, Mn, Fe, Ni, Cu, Ag, Zn, B, Ga, C, Si, Sn, N, P, S, F, or Cl.

In the formula, each of x, y, w, a, b, and c denotes the content ratio (molar ratio) of each element, and α is a value for adjustment of the molar ratio of O. The details will be discussed below. The content ratio may sometimes be referred to as "content" or simply "amount" hereinbelow.

In the formula, x denotes the total content of Li and Na. The range of x is 1.010<x≤1.050, preferably 1.010<x≤1.030. When x is not more than 1.010, the stability in the Li-eliminated state, in particular, continuous charging characteristics are significantly poor, whereas when x is over 1.050, the crystallinity is low, which in turn deteriorates the charge/discharge capacity and the cycle characteristics.

In the formula, (x−y) denotes the amount of Li. Li, when used in a battery subjected to charge/discharge, migrates due to intercalation/deintercalation. The range of (x−y) is 1.005<(x−y)<1.050, preferably 1.005<(x−y)<1.030. When the Li content is not more than 1.005, the stability of the crystal structure under the Li-elimination is poor, whereas when not less than 1.050, the crystallinity is low, which in turn deteriorates the charge/discharge capacity and the cycle characteristics.

In the formula, y denotes the amount of Na. Na dissolves between the layers of a layered compound LiCoO$_2$ and prevents disintegration of the crystal structure during charging, where Li is eliminated. This is assumed to be because Na, compared to Li, has less mobility and requires more time for extraction by voltage application, so that Na tends to stay between the layers and inhibit disintegration of the crystal structure, to thereby improve the durability during charging. By optimizing y, disintegration may be inhibited of the crystal structure caused by elimination of Li during continuous charging or high-voltage charging at not lower than 4.3 V, which eventually contributes to high capacity or excellent cycle characteristics. Since Na is larger in ion radius than Li, partial substitution of Li with Na expands the interlayer distance, which may be confirmed by powder X-ray diffraction (XRD) wherein the peak is shifted toward the lower angle side, compared to a material without Na. The range of y is preferably 0<y≤0.020, more preferably 0.002≤y≤0.018. When y is over 0.020, excess Na may not be accommodated in the Li layers, and the crystal structure may not be maintained, which is assumed to adversely affect eventually the battery characteristics.

In the formula, w denotes the amount of Co. Co is one of the main elements constituting the lithium-containing composite oxide of the present invention. The range of w is 0.990≤w≤1.015. When w is less than 0.990, the capacity and the cycle characteristics are low, whereas when w is over 1.015, the stability of the crystal structure is low.

In the formula, a denotes the amount of Al. Al stabilizes the crystal structure to improve the thermal stability and continuous charging characteristics. The cycle characteristics are greater when the Al amount on the surface of the cathode active material particles is larger than that in the bulk. The range of a is 0.005≤a≤0.020, preferably 0.010≤a≤0.016. When a is less than 0.005, the continuous charging characteristics are significantly poor, whereas when a is over 0.020, the capacity is low.

In the formula, b denotes the amount of Mg. Mg stabilizes the crystal structure to improve the thermal stability and continuous charging characteristics. The range of b is 0.001≤b≤0.020, preferably 0.005≤b≤0.012. When b is less than 0.001, the effects discussed above may not be produced sufficiently, whereas when b is over 0.020, the specific surface area may be too small.

In the formula, c denotes the amount of element M. Element M is at least one element selected from Ca, Y, rare earth elements, Ti, Zr, Hf, V, Nb, Ta, Cr, Mo, W, Mn, Fe, Ni, Cu, Ag, Zn, B, Ga, C, Si, Sn, N, P, S, F, or Cl. The range of c is preferably 0.0005≤c≤0.005, more preferably 0.001≤c≤0.003. When c is not less than 0.0005, element M contributes to improvement in stability of the crystal structure, whereas when c is over 0.005, the cycle characteristics may be impaired, though the detailed mechanism thereof is not known.

When Zr is contained as M, the stability of the crystal structure is still more improved. The amount of Zr is preferably not less than 0.0001 and less than 0.005, more preferably not less than 0.0005 and not more than 0.003. When the amount of Zr is less than 0.0001, the effects discussed above may not be produced sufficiently, whereas when the amount of Zr is not less than 0.005, the specific surface area may be too small.

When Ti is contained as M, the rate of deintercalation/intercalation of Li during charging/discharging is high, and thus the load characteristics are high. The amount of Ti is preferably not less than 0.0001 and less than 0.005, more preferably not less than 0.0005 and not more than 0.003. When the amount of Ti is less than 0.0001, the effects discussed above may not be produced sufficiently, whereas when the amount of Ti is not less than 0.005, growth of primary particles is suppressed, possibly resulting in increased number of primary particles constituting a secondary particle.

It is preferred that both Ti and Zr are contained as M. When M is Ti and Zr, a cathode active material may be obtained which may produce batteries of high load characteristics and high capacity with stable quality.

In the formula, $2+\alpha$ denotes the amount of oxygen, and the range thereof is determined depending on the contents of Li, Co, Al, Mg, and M. The range of $\alpha$ is $-0.1 \le \alpha \le 0.1$.

By $(x)/(w+a+b+c)$ is represented the molar ratio of (Li+Na) to (Co+Al+Mg+M). Preferably, $(x)/(w+a+b+c)$ is not less than 0.990, and when less than 0.990, the continuous charging time is significantly short.

The cathode active material according to the present invention is in the form of lithium-containing composite oxide particles having a compound adhered on the surface thereof, which compound comprises at least one element selected from Al, Mg, and M (the same as element M in formula (1)) (sometimes referred to as "adhering compound" hereinbelow). The adhering compound is an inorganic compound, such as a hydroxide, oxide, or carbonate, of the elements referred to above. It is preferred to uniformly disperse and adhere the inorganic compound over the surface of the composite oxide particles. The particle size of the cathode active material is not particularly limited, and may preferably be about 2 to 50 µm in average particle size so as to achieve sufficient density when the particles are applied to an electrode plate. For improved density, two or more cathode active materials having different average particle sizes falling within the above-mentioned particle size range, may be mixed for use.

A method for producing the cathode active material according to the present invention will now be discussed.

First, a method for producing the lithium-containing composite oxide in the cathode active material of the present invention is not particularly limited, as long as the lithium-containing composite oxide of the present invention is obtainable. For example, the cathode active material of the present invention may be obtained by mixing a lithium compound as a lithium source, a sodium compound as a sodium source, a cobalt compound as a cobalt source, an aluminum compound as an aluminum source, a magnesium compound as a magnesium source, and a compound of M as a source of M, followed by calcination of the resulting mixture.

The lithium compound may be, for example, an inorganic salt, such as lithium hydroxide, lithium chloride, lithium nitrate, lithium carbonate, or lithium sulfate, or an organic salt, such as lithium formate, lithium acetate, or lithium oxalate.

The sodium compound may be, for example, an inorganic salt, such as sodium hydroxide, sodium chloride, sodium nitrate, sodium carbonate, or sodium sulfate, or an organic salt, such as sodium formate, sodium acetate, or sodium oxalate.

The cobalt compound may be, for example, an oxide, a hydroxide, a carbonate, or an oxyhydroxide, preferably an oxide of cobalt. Since the cathode active material takes on the shape of the cobalt compound, the shape of the cathode active material may be controlled by forming the cobalt compound into spherical or oval-spherical shape, and adjusting the particle size, the particle size distribution, or the like factors.

The aluminum compound may be, for example, aluminum hydroxide, aluminum chloride, aluminum oxide, aluminum carbonate, aluminum nitrate, aluminum sulfate, or aluminum formate.

The magnesium compound may be, for example, magnesium hydroxide, magnesium carbonate, magnesium chloride, magnesium peroxide, magnesium oxide, magnesium nitrate, magnesium acetate, magnesium carbonate, or magnesium nitrate.

The compound of M may vary depending on the element selected, and may be an oxide, hydroxide, carbonate, sulfate, nitrate, or halide containing M, or a gas containing M.

With the above-mentioned compounds provided as raw materials, first, prescribed amounts of a lithium compound, a sodium compound, a cobalt compound, an aluminum compound, a magnesium compound, and optionally a compound of M, are respectively measured out and mixed together. The mixing may be carried out by a conventional process, such as in a ball mill, and preferably in a high-speed stirring mixer for improved dispersion.

Then, the resulting mixture is calcined. The calcination may be carried out by a conventional process in a bogie hearth, a kiln, or a mesh belt furnace at 950 to 1050° C. for 1 to 24 hours, preferably at 1030 to 1050° C. The calcination may be carried out by preliminary calcination at a temperature lower than the intended temperature, followed by raising the temperature up to the intended temperature, or by calcination at the intended temperature, followed by annealing at a lower temperature. The preliminary calcination or annealing may preferably be carried out at 500 to 800° C. for 30 minutes to 6 hours.

Aside from mixing respective compounds of Li, Na, Co, Al, Mg, and M before calcination, a composite compound obtained by compounding Co, Al, Mg, and M through co-precipitation may preferably be mixed with a Li compound and a Na compound before calcination.

The adhering compound may be adhered over the surface of the particles of the lithium-containing composite oxide thus obtained by, for example, the following steps:

Step 1: separately measuring out a lithium-containing composite oxide (in the form of particles), a raw material of an adhering compound, and a lithium hydroxide monohydrate as a pH adjustor;

Step 2: dissolving the lithium hydroxide monohydrate in 100 mL of pure water, and introducing the lithium-containing composite oxide therein to prepare a first slurry;

Step 3: dissolving the raw material of an adhering compound in 10 mL of pure water to prepare a raw material solution of an adhering compound;

Step 4: introducing the raw material solution of an adhering compound into the first slurry to prepare a second slurry;

Step 5: stirring the second slurry obtained in Step 4 to stabilize its pH;

Step 6: subjecting the pH-stabilized second slurry to filtration, and wash the obtained cake (filter cake) with pure water; and Step 7: calcining the washed cake in the manner discussed above to obtain a cathode active material wherein an adhering compound is adhered to the surface of lithium-containing composite oxide particles.

In the above-mentioned method, washing may be performed. By washing, excess Na not dissolved between the layers of the lithium-containing composite oxide may be removed. This step may reduce Na eluting into an electrolyte to suppress a side reaction that disturbs insertion/elimination of lithium ions generated in the electrolyte, to thereby minimize the deterioration of charge/discharge characteristics caused by Na. Incidentally, the washing may be performed either before or after the step of adhering an adhering compound to the surface of lithium-containing composite oxide particles, as long as the side reaction is suppressed.

Next, the cathode for a nonaqueous electrolyte rechargeable battery according to the present invention will be discussed.

The cathode for a nonaqueous electrolyte rechargeable battery according to the present invention contains the cathode active material of the present invention discussed above. With the cathode active material of the present invention contained, since the crystal structure of a cathode active material during charging is stable, the cathode is suitable for a nonaqueous electrolyte rechargeable battery of high capacity and high cycle characteristics with little deterioration by continuous or high-voltage charging.

The cathode of the present invention may be fabricated by a conventional method using the cathode active material of the present invention, including mixing the cathode active material together with an electrically conductive material and a binder with a dispersion medium to prepare a slurry, applying the slurry to an electrode plate, drying, rolling the electrode plate with rollers, and cutting the plate into a predetermined size. With the cathode active material of the present invention, the obtained electrode slurry has the cathode active material, the electrically conductive material, and the binder uniformly dispersed therein, has a moderate fluidity, and changes little with the lapse of time. The cathode is generally made to have a thickness of 40 to 120 µm.

The electrically conductive material, the binder, the dispersion medium, the electrode plate, and the like for fabricating the cathode may be conventional and, for example, the electrically conductive material may be a carbonaceous material, such as natural graphite, artificial graphite, Ketjen black, or acetylene black.

The binder may be a fluororesin, such as polytetrafluoroethylene or polyvinylidene fluoride, polyvinyl acetate, polymethylmethacrylate, an ethylene-propylene-butadiene copolymer, a styrene-butadiene copolymer, an acrylonitrile-butadiene copolymer, or carboxymethyl cellulose. The dispersion medium may be N-methylpyrrolidone, tetrahydrofuran, ethylene oxide, methyl ethyl ketone, cyclohexanone, methyl acetate, methyl acrylate, diethyltriamine, dimethylformamide, or dimethylacetamide.

The electrode plate may be a porous or nonporous electrically conductive substrate. The electrically conductive substrate may be metal foil, such as of Al, Cu, Ti, or stainless steel. Among these, Al, in particular, aluminum foil of 10 to 30 µm thick is preferred.

Next, the nonaqueous electrolyte rechargeable battery according to the present invention will be discussed.

The nonaqueous electrolyte rechargeable battery of the present invention is provided with the cathode for a nonaqueous electrolyte rechargeable battery of the present invention discussed above. With the cathode for a nonaqueous electrolyte rechargeable battery of the present invention, since the crystal structure of the cathode active material during charging is stable, a nonaqueous electrolyte rechargeable battery of high capacity and high cycle characteristics with little deterioration by continuous or high-voltage charging, is obtained.

The nonaqueous electrolyte rechargeable battery of the present invention is composed mainly of, for example, a battery case, a cathode, an anode, an organic solvent, an electrolyte, and a separator. The organic solvent and the electrolyte (electrolyte solution) may be replaced with a solid electrolyte. The anode, the organic solvent, the electrolyte, and the separator may be conventional ones.

The anode may be produced, for example, by applying an anode material mixture containing an anode active material, a binder, an electrically conductive material, a dispersion medium, and the like, on a collector made of metal foil, such as of Cu, rolling, and drying. The anode active material may be a lithium metal, a lithium alloy, or a carbonaceous material, such as amorphous carbon, e.g., soft carbon or hard carbon, artificial graphite, or natural graphite. A binder and a dispersion medium may be similar to those used in the cathode, as necessary.

The organic solvent is not particularly limited in kind, and may be, for example, carbonates, such as propylene carbonate, ethylene carbonate, dimethyl carbonate, diethyl carbonate, and ethyl methyl carbonate; ethers, such as 1,2-dimethoxypropane, 1,3-dimethoxypropane, tetrahydrofuran, and 2-methyltetrahydrofuran; esters, such as methyl acetate and γ-butyrolactone; nitriles, such as acetonitrile and butyronitrile; and amides, such as N,N-dimethylformamide and N,N-dimethylacetamide. One or a combination of two or more of these may be used.

The electrolyte to be dissolved in the organic solvent may be, for example, $LiClO_4$, $LiPF_6$, $LiBF_4$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, short-chain aliphatic lithium carboxylate, lithium tetrachloroborate, lithium tetraphenylborate, or imides. One or a combination of two or more of these may be used.

The solid electrolyte, when used, may be, for example, polymer electrolytes, such as polyethylene oxide electrolyte; or sulfate electrolytes, such as $Li_2S$—$SiS_2$, $Li_2S$—$P_2S_5$, and $Li_2S$—$B_2S_3$. Alternatively, a so-called gel-type electrolyte, wherein a nonaqueous electrolyte solution is retained in a polymer, may also be used.

The separator may preferably be, for example, a microporous membrane having high ion permeation, prescribed mechanical strength, and electrical insulation. Use of microporous membrane made of, for example, polyethylene, polypropylene, polyphenylenesulfide, polyethylene terephthalate, polyamide, or polyimide, is preferred for its hydrophobicity and resistance to the electrolyte, and one or a combination of a plurality of these may be used. In view of the production cost, inexpensive polypropylene may preferably be used.

The nonaqueous electrolyte rechargeable battery according to the present invention may take various shapes, such as cylindrical, laminated, and coin shapes. In any shape, the nonaqueous electrolyte battery of the present invention may be fabricated by placing the above-mentioned constituent components in a battery case, connecting the cathode and the anode to a cathode terminal and an anode terminal, respectively, with collector leads, and sealing the battery case.

In the evaluation of stability of the crystal structure during continuous or high-voltage charging, which is characteristic of the cathode active material of the present invention, the time lapsed after full charge until occurrence of leakage current was used as an evaluation index. When a rechargeable battery is fully charged, the current value drops down to approximately 0 mA. When the battery is further charged continuously, structural disintegration of the cathode active material due to elution of Co and other elements and accordingly, the current (leakage current) due to micro-short circuit are observed. The time lapsed until the occurrence of this leakage current is the index of stability of the crystal structure under continuous charging conditions. Specifically, the time was determined that lapsed until the current value, once dropped down approximately to 0 mA, increased again due to the leakage current and reached the baseline level set at 0.06 mA. The longer time indicates greater stability of the crystal structure, and the shorter time indicates less stability of the crystal structure.

Incidentally, a specific method of evaluation will be discussed in detail later.

EXAMPLE

The present invention will now be explained in more detail with reference to Examples and Comparative Examples, which do not intend to limit the present invention.

Example 1

<Preparation of Cathode Active Material>

Lithium carbonate, sodium carbonate, cobalt oxide, aluminum hydroxide, magnesium hydroxide, titanium oxide, and zirconium oxide were respectively measured out so that the eventually obtained cathode active material had the composition shown in Table 1, and mixed in a high-speed stirring mixer to obtain a mixture.

The obtained mixture was then preliminarily calcined in a box-shaped electric furnace at 700° C. for 4 hours, and then calcined at 1030° C. for 5 hours to obtain a lithium-containing composite oxide (simply referred to as a composite oxide hereinbelow).

With respect to 100 g of this composite oxide, 0.383 g of aluminum nitrate nonahydrate (first grade, WAKO PURE CHEMICAL INDUSTRIES, LTD.) as a raw material of a compound to be adhered to the surface of the composite oxide, and 0.129 g of lithium hydroxide monohydrate (special grade, WAKO PURE CHEMICAL INDUSTRIES, LTD.) as a pH adjuster were measured out. The amount of the aluminum nitrate nonahydrate with respect to the composite oxide was 0.1 mol %, and the amount of the lithium hydroxide monohydrate with respect to the composite oxide was 0.3 mol %.

The lithium hydroxide monohydrate was dissolved in 100 mL of pure water, and then the composite oxide was introduced thereinto prepare a first slurry. On the other hand, the aluminum nitrate nonahydrate was dissolved in 10 mL of pure water, to prepare a raw material solution of an adhering compound. The raw material solution of an adhering compound was introduced into the first slurry at a rate of 5 mL/min with a pipetter, and stirred for over 5 minutes until the pH was confirmed to be stable around 10.7, to obtain a second slurry.

The second slurry thus obtained was subjected to filtration, and the obtained cake was washed with 200 mL of pure water. The washed cake was calcined by heating at a temperature-raising rate of 5° C./min up to 500° C. and maintaining the temperature for 3 hours, to obtain a cathode active material in the form of composite oxide particles having the Al compound adhered over the surface thereof. The composition of the cathode active material thus obtained is shown in Table 1.

The powder X-ray diffraction (XRD) of the cathode active material was performed in an X-ray diffractometer (UltimaIV, RIGAKU CORPORATION), and the diffraction pattern at $2\theta=18.5$ to $19.3°$ with the peak is shown in FIG. 1.

<Fabrication of Battery>

Next, the cathode active material, graphite and acetylene black as electrically conductive materials, and polyvinylidene fluoride as a binder were mixed at a mass ratio of 200:4:1:10, and kneaded with N-methylpyrrolidone into slurry. The electrode slurry thus obtained was applied on aluminum foil of 20 μm thick, dried, pressure formed in a press into a thickness of 40 μm, and cut into a prescribed size. A terminal was spot-welded, and a cathode was produced.

With the cathode thus obtained, a coin cell rechargeable battery for testing was fabricated as follows. Lithium metal foil as a counter electrode (anode) and the cathode obtained above as a testing electrode were placed in a battery case with the intervention of a separator therebetween. An electrolyte prepared by dissolving at 1 M a support electrolyte $LiPF_6$ in a 1:2 (by volume) mixed solvent of ethylene carbonate (EC) and dimethyl carbonate (DMC), was introduced into the case to obtain a coin cell rechargeable battery.

<Charge/Discharge Test>

A charge/discharge test was conducted on the coin cell rechargeable battery fabricated above.

(1) At the measuring temperature of 25° C., the battery was subjected to charging/discharging at 0.3 $mA/cm^2$ between the maximum charging voltage of 4.5 V and the minimum discharging voltage of 3.0 V at the first and second cycles.

(2) At the third cycle and thereafter, the charging/discharging was carried out at 1.5 $mA/cm^2$ between the maximum charging voltage of 4.5 V and the minimum discharging voltage of 3.0 V.

(3) The charge capacity and the discharge capacity at the charge/discharge current of 0.3 $mA/cm^2$ were measured, and the capacity retention (%) after 22 cycles at the charge/discharge current of 1.5 $mA/cm^2$ calculated by the following formula was determined:

Capacity retention (%)=(discharge capacity at 22nd cycle/discharge capacity at 3rd cycle)×100

The discharge capacity at the first cycle and the capacity retention are shown in Table 1.

<Continuous Charging Test>

For evaluation of stability of the crystal structure during continuous charging, the following electrochemical measurements were made. The measurements were made using an electrochemical measurement apparatus (BLS5516, KEISOKUKI CENTER CO., LTD.) on coin cell rechargeable batteries fabricated in the same way as above.

(1) First, the coin cell rechargeable battery was activated by charging at 0.36 mA/cm² at 4.5 V by constant-voltage constant-current (CVCC) method until the current value reaches 0.03 mA.

(2) After a 30-minute break, the battery was discharged at 0.36 mA/cm² by constant-current (CC) method until the cell voltage reaches 3.0 V.

(3) Then, the battery was charged again at 1.8 mA/cm² at 4.5 V by constant-voltage constant-current (CVCC) method.

(4) By the last charging, the battery was fully charged, and the current value dropped down to approximately 0 mA. When the battery was further charged continuously, the current value, once dropped down to near 0 mA, increases again due to leakage current. The time lapsed until the leakage current value reached 0.06 mA (continuous charging time) was determined. The results are shown in Table 1.

Examples 2 to 5

A cathode active material was prepared in the same way as in Example 1, except that the compositional ratio of the raw materials was changed so that the composition of the eventually obtained cathode active material was as shown in Table 1. With the cathode active material thus obtained, a coin cell rechargeable battery was fabricated, and the charge/discharge test and the continuous charging test were conducted in the same way as in Example 1. The results are shown in Table 1. The powder X-ray diffraction (XRD) patterns for Examples 2 and 3 are shown in FIG. 1.

Comparative Example 1 to 3 and 5

A cathode active material was prepared in the same way as in Example 1, except that the compositional ratio of the raw materials was changed so that the composition of the eventually obtained cathode active material was as shown in Table 1. With the cathode active material thus obtained, a coin cell rechargeable battery for a comparative example was fabricated, and the charge/discharge test and the continuous charging test were conducted in the same way as in Example 1. The results are shown in Table 1. The powder X-ray diffraction (XRD) pattern for Comparative Example 1 is shown in FIG. 1.

Comparative Example 4

A cathode active material was prepared in the same way as in Example 1, except that the Al compound was not adhered to the surface of the composite oxide particles obtained in Example 3. The composition of the cathode active material thus obtained is shown in Table 1. With the cathode active material thus obtained, a coin cell rechargeable battery for a comparative example was fabricated, and the charge/discharge test and the continuous charging test were conducted in the same way as in Example 1. The results are shown in Table 1.

TABLE 1

| | Content of each element (molar ratio) | | | | | | | | | | | Continuous | | |
|---|---|---|---|---|---|---|---|---|---|---|---|---|---|---|
| | | | | | | | | M | | (x)/(w + | | Na | charging | Discharge | Capacity |
| | Li $x-y$ | Na $y$ | Li + Na $x$ | Co $w$ | Al $a$ | Mg $b$ | Zr | Ti | $w + a + b + c$ | $a + b + c$) | Al coating | content (ppm) | time (h) | capacity (mAh/g) | retention (%) |
|---|---|---|---|---|---|---|---|---|---|---|---|---|---|---|---|
| | | | | | | | $c$ | | | | | | | | |
| Example 1 | 1.028 | 0.002 | 1.030 | 1.00 | 0.012 | 0.008 | 0.001 | 0.001 | 1.022 | 1.008 | present | 400 | 124 | 183.8 | 93 |
| Example 2 | 1.026 | 0.004 | 1.030 | 1.00 | 0.013 | 0.008 | 0.001 | 0.001 | 1.023 | 1.007 | present | 930 | 165 | 182.6 | 92 |
| Example 3 | 1.011 | 0.009 | 1.020 | 1.00 | 0.013 | 0.008 | 0.001 | 0.001 | 1.023 | 0.997 | present | 2100 | 174 | 181.3 | 93 |
| Example 4 | 1.006 | 0.014 | 1.020 | 1.00 | 0.011 | 0.008 | 0.001 | 0.001 | 1.021 | 0.999 | present | 3100 | 198 | 182.1 | 94 |
| Example 5 | 1.006 | 0.018 | 1.024 | 1.00 | 0.011 | 0.008 | 0.001 | 0.001 | 1.021 | 1.003 | present | 4200 | 178 | 180.3 | 90 |
| Comp. Ex. 1 | 1.030 | 0.000 | 1.030 | 1.00 | 0.011 | 0.008 | 0.001 | 0.001 | 1.021 | 1.009 | present | 0 | 77.6 | 183.8 | 94 |
| Comp. Ex. 2 | 1.005 | 0.005 | 1.010 | 1.00 | 0.008 | 0.008 | 0.001 | 0.000 | 1.017 | 0.993 | present | 1100 | 43.5 | 187.5 | 98 |
| Comp. Ex. 3 | 0.991 | 0.009 | 1.000 | 1.00 | 0.008 | 0.008 | 0.001 | 0.000 | 1.017 | 0.983 | present | 2200 | 44.5 | 185.3 | 97 |
| Comp. Ex. 4 | 1.007 | 0.013 | 1.020 | 1.00 | 0.011 | 0.008 | 0.001 | 0.001 | 1.021 | 0.999 | absent | 2900 | 200 | 180.5 | 76 |
| Comp. Ex. 5 | 0.994 | 0.024 | 1.018 | 1.00 | 0.011 | 0.008 | 0.001 | 0.001 | 1.021 | 0.997 | present | 5500 | 149 | 177.2 | 76 |

As may be seen clearly from Table 1, Examples were significantly superior in continuous charging time, compared to Comparative Examples 1 to 3. In Comparative Example 4, the continuous charging time was comparable to those in Examples, but the capacity retention was remarkably small compared to those in Examples, since the Al compound was not adhered to the particle surface. In Comparative Example 5, the Na content was over the maximum amount, so that the overall battery performance was inferior to those in Examples.

FIG. 1 clearly indicates that as the amount of Na substituting Li increases, the peak indicating the C-axis shifts to the lower-angle side. This is ascribable to the substitution of Li with Na, which has a larger ion radius than Li, to expand the interlayer distance. It is assumed that even if Li is eliminated, Na remains between the layers to inhibit disintegration of the crystal structure.

What is claimed is:

1. A cathode active material for a nonaqueous electrolyte rechargeable battery, comprising a lithium-containing composite oxide particle and a compound adhered on a surface thereof, wherein said cathode active material has a composition of formula (1):

$$Li_{x-y}Na_yCo_wAl_aMg_bM_cO_{2+\alpha}$$ (1)

wherein x, y, w, a, b, c, and a fulfill $1.005<(x-y)<1.041$, $0.009 \leq y \leq 0.020$, $1.010<x \leq 1.050$, $0.990 \leq w \leq 1.015$, $0.005 \leq a \leq 0.020$, $0.001 \leq b \leq 0.020$, $0.001 \leq c \leq 0.003$, $-0.1 \leq \alpha \leq 0.1$; and M consists of Ti and Zr; and wherein said compound contains at least one element selected from the group consisting of Al, Mg, and M.

2. The cathode active material for a nonaqueous electrolyte rechargeable battery according to claim 1, wherein y fulfills $0.009 \leq y \leq 0.018$.

3. The cathode active material for a nonaqueous electrolyte rechargeable battery according to claim 1, wherein a ratio (x)/(w+a+b+c) of (Li+Na) to (Co+Al+Mg+M) is not less than 0.990 and not more than 1.020.

4. A cathode for a nonaqueous electrolyte rechargeable battery comprising the cathode active material for a nonaqueous electrolyte rechargeable battery of claim 1.

5. A nonaqueous electrolyte rechargeable battery comprising the cathode for a nonaqueous electrolyte rechargeable battery of claim 4.

\* \* \* \* \*